United States Patent [19]

Jin et al.

[11] Patent Number: 4,644,101
[45] Date of Patent: Feb. 17, 1987

[54] PRESSURE-RESPONSIVE POSITION SENSOR

[75] Inventors: Sungho Jin, Millington; John J. Mottine, Jr., West Keansburg; Richard C. Sherwood, New Providence; Thomas H. Tiefel, Piscataway, all of N.J.

[73] Assignee: AT&T Bell Laboratories, Murray Hill, N.J.

[21] Appl. No.: 807,807

[22] Filed: Dec. 11, 1985

[51] Int. Cl.$^4$ .............................................. G08C 21/00
[52] U.S. Cl. ..................................... 178/18; 340/706; 428/328; 428/329; 428/900
[58] Field of Search ..................... 178/18, 19; 428/323, 428/900, 409, 327, 328, 329; 340/706; 365 A

[56] References Cited

U.S. PATENT DOCUMENTS

| | | | |
|---|---|---|---|
| 4,071,689 | 1/1978 | Talmage et al. | 178/18 |
| 4,121,049 | 10/1978 | Roeber | 178/18 |
| 4,214,122 | 7/1980 | Kley | 178/18 |
| 4,293,734 | 10/1981 | Pepper, Jr. | 178/18 |
| 4,448,837 | 5/1984 | Ikeda et al. | 178/18 |
| 4,449,774 | 5/1984 | Takashi et al. | 339/59 M |

OTHER PUBLICATIONS

U.S. patent application Ser. No. 682,780, filed Dec. 18, 1984, J. Federico et al.
U.S. patent application Ser. No. 728,813, filed Apr. 30, 1985, S. Jin et al.
*Displays*, "Graphic Tablets—a Review", D. J. Grover, Jul 1979, pp. 83-93.

*Primary Examiner*—Stafford D. Schreyer
*Attorney, Agent, or Firm*—Peter A. Businger

[57] ABSTRACT

Electrical signals are produced by a pressure-responsive device, such signals being indicative of the position of locally applied pressure. The device comprises a position sensor assembly which comprises a composite layer medium including electrically conductive magnetic particles in a nonconductive matrix material. The particles are aligned into chains extending across the thickness of the layer, and chains include a non-conductive gap which is bridged upon application of sufficient pressure. The medium is sandwiched between sheet electrodes, and the resulting assembly may be transparent as is advantageous in writing pad and touch-sensitive screen applications. The pressure-responsive device is suitable, e.g., as an input device in graphics information systems, in combination with transmission and display facilities.

15 Claims, 7 Drawing Figures

PRESSURE-RESPONSIVE POSITION SENSOR

FIELD OF THE INVENTION

The invention is concerned with devices for producing electrical signals as a function of localized pressure.

BACKGROUND OF THE INVENTION

Sensor devices have been proposed for determining the location of a pressure signal as produced, e.g., by a stylus or by digital touching; such a device may take the form of a writing pad or of a touch screen for entering data into a computer system.

Some devices of this type utilize two mutually orthogonal electrical fields and a movable probe to obtain electrical signals corresponding to x-y coordinates of the position of the probe; others operate with an inactive pointer, such as, e.g., a finger or stylus, by measuring echo signal transit times, light beam interruptions, capacitance change of distributed tabs, or forces at the periphery of the surface. The following documents are cited as representative of the state of the art.

U.S. Pat. No. 4,071,689, issued Jan. 31, 1978 to J. E. Talmadge et al. discloses an electrographic sensor comprising a rigid, optically transparent substrate which supports a uniformly resistive layer, and a resistor network around the perimeter of the substrate. The device operates with a conductive stylus and an oscillator.

U.S. Pat. No. 4,121,049, issued Oct. 17, 1978 to F. R. Roeber discloses devices which rely on z-direction mechanical displacement transverse to the x-y plane of an input surface. Springs, differential transformers, or variable-reluctance pickups are used.

U.S. Pat. No. 4,214,122, issued July 22, 1980 to V. B. Kley discloses a resistive planar graphical input insulating substrate. Conductor strips around the periphery of the resistive layer are designed to enhance linearity of device performance.

U.S. Pat. No. 4,293,734, issued Oct. 6, 1981 to to W. Pepper, Jr. discloses a method for determining the position of a source or sink of electric current on the surface of a resistive element or impedance layer.

U.S. patent application Ser. No. 682,780, filed Dec. 18, 1984 by J. Federico et al. discloses the production of position-related electrical signals upon local contact between two conductive surfaces. The two surfaces may be spaced apart by various means such as, e.g., by a layer of a fluid insulating medium, by movable microspheres, by rubber pedestals which may be impregnated with conductive particles, or by a photoconductive layer.

For a general review of the field of location sensors see, e.g., the paper by D. J. Grover, "Graphics Tablets—A Review", Displays, Volume 1 (1979), pp. 83-93.

Also of interest in connection with the invention is U.S. patent application Ser. No. 728,813, filed Apr. 30, 1985 by S. Jin et al.

SUMMARY OF THE INVENTION

The invention is a device for producing electrical signals related to the location of a pressure signal. The device comprises a position sensor assembly or pad which in turn comprises a composite medium comprising electrically conducting particles in an essentially nonconductive matrix material. The particles are aligned into chains which comprise at least two particles and which extend between opposite surfaces of the medium. The medium is sandwiched between conductor layers such that, in the absence of pressure, the conductor layers remain electrically essentially insulated from each other. Appreciable conduction through the medium occurs only when, upon application of a sufficient amount of local pressure, at least one particle chain is rendered conductive. Electrical signals produced as a result of localized conduction through the medium may be analyzed to obtain x-y coordinate information of the position of the pressure signal in analog or digital form; such information may be displayed on devices such as, e.g., cathode ray tubes, plasma panels, or liquid crystal display devices.

A sensor device in accordance with the invention may be transparent, e.g., in the preferred sense that at least 70 percent of visible light incident on the sensor medium be transmitted.

Sensor devices in accordance with the invention are suitable for use not only in communcations systems but also, e.g., in security, alarm, and identification systems.

DETAILED DESCRIPTION

Figure 1:
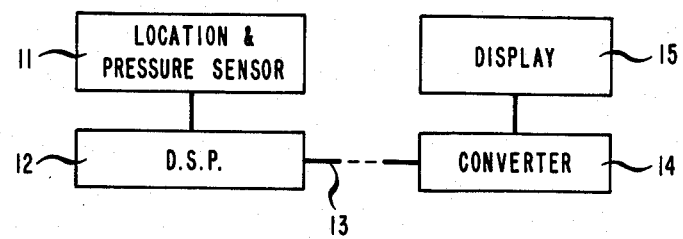
FIG. 1 is a block diagram of a graphics input-output system.

FIG. 1 is a block diagram showing components of a graphics input-output system comprising sensor 11 for supplying electrical signals to a digital signal processor 12. Suitably shpaed signals are transmitted over transmission lines 13, and the transmitted signals are supplied to a converter 14 which transforms them into a form acceptable to display means 15.

Figure 2:
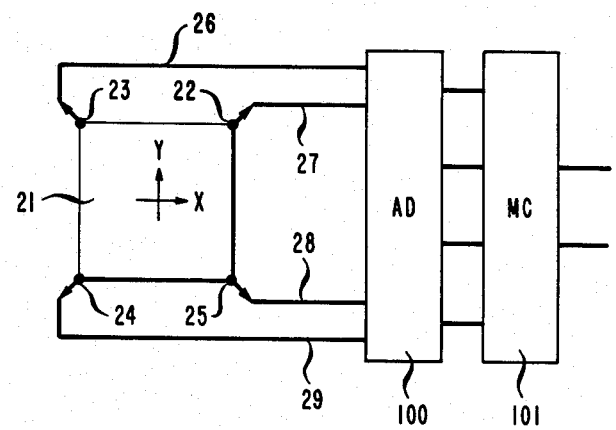
FIG. 2 schematically shows a presure-responsive sensor as may be used in the system of FIG. 1.

FIG. 2 shows an x-y pressure sensor 21, analog-to-digital converter 100, and microcomputer 101. Such an arrangement can serve as a graphics sensor, and its operation involves sampling signals at terminals 22, 23, 24, and 25, such signals being determinative of the position of a pressure signal on the surface of pressure sensor 21. Signals are transmitted to converter 100 by leads 26, 27, 28, and 29. Sensor 21 is shown face-on; its preferred cross-sectional structure is of a type as illustrated in FIGS. 3-6.

Figure 3:
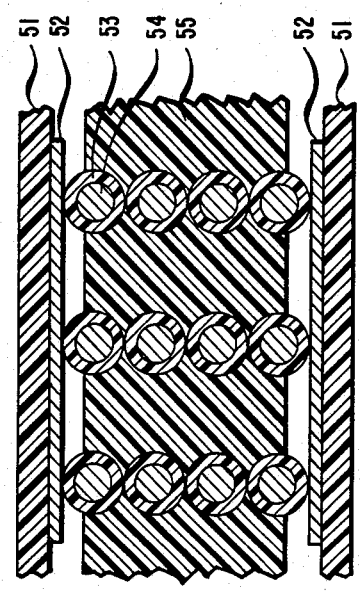
FIGS. 3, 4, 5, and 6 are cross-sectional views of preferred sensor assemblies illustrative of the invention.

FIG. 3 shows a pressure-responsive sensor comprising a composite medium and two conductor assemblies. The composite medium consists of aligned conductive particles 34 in a nonconductive matrix 35. The conductor assemblies consist of substrates 31 covered by layers 32 of a conductive coating which in turn are covered by layers 33 of a nonconductive coating. Such nonconductive coating may be made of a nonconductive polymer, epoxy or other resin, or any other material with elastomeric properties, and such preferred material is capable of being mechanically punctured by conductive particles 34 when sufficient local pressure is applied to substrates 31.

When an external voltage is applied to the conductor layers 32, the nonconductive coating 33 prevents conduction between conductor layers 32. Current flows only upon application of local pressure sufficient for end particles 34 to penetrate the respective nonconductive coatings 33 and thus to come into contact with conductive coatings 32. As a result of such contact, current flows along electrically conductive paths through chains of electrically conductive particles 34 in the z-direction transverse to the x-y plane of the matrix material.

Figure 4:
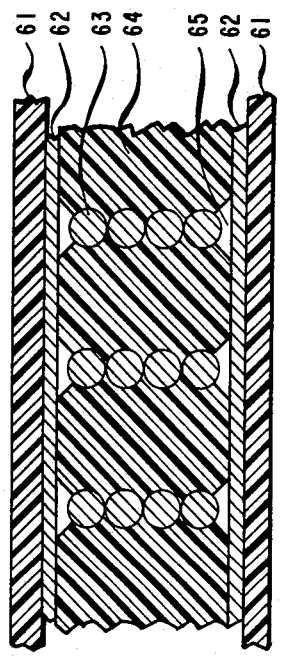

FIG. 4 shows an alternate pressure-responsive sensor comprising nonconductive coating 43 on a composite medium which consists of aligned conductive particles 44 in a nonconductive matrix material 45. A conductor substrate 41 covered with a layer of conductive coating 42 is in contact with the nonconductive coating 43. The nonconductive coating can be applied to one or both surfaces of the composite medium, e.g., by spraying, spreading, or dip coating; application may be facilitated by using the coating material in solution with a suitable volatile solvent which is compatible with the composite medium. Sensor operation is analogous to device operation described above in connection with FIG. 3.

Figure 5:
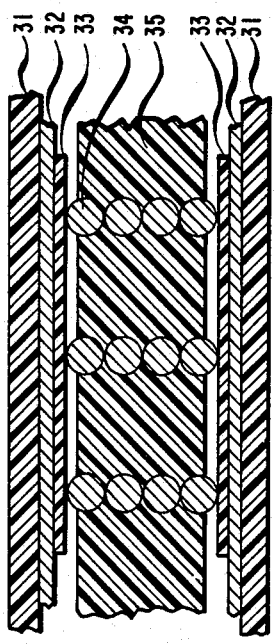

FIG. 5 shows a pressure responsive sensor comprising conductive particles 54 individually coated with nonconductive coating 53, the coated particles being embedded in matrix material 55. Conductive coating 52 on substrate 51 is in physical contact with the nonconductive coating on the particles. Sensor operation is analogous to device operation described above in connection with FIG. 3.

Figure 6:
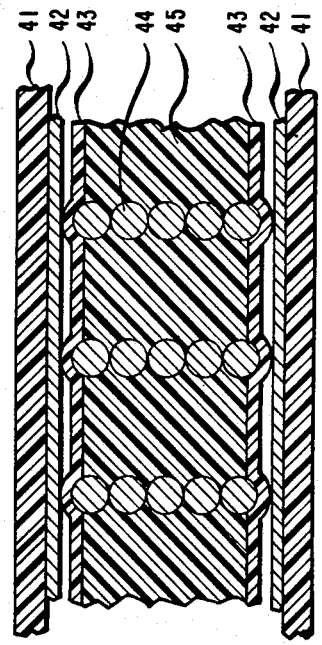

FIG. 6 shows a pressure-responsive sensor comprising conductive particles 63 recessed in the nonconductive matrix material 64, the depth of recess being chosen as a function of the stiffness of the matrix material and the desired pressure response. A region of nonconductive matter 65 such as, e.g., air or the same material as the matrix material is situated between recessed particles and a conductor assembly. The conductor substrate 61 is covered with conductive coating 62. Sensor operation is analogous to device operation described above in connection with FIG. 3.

Figure 7:
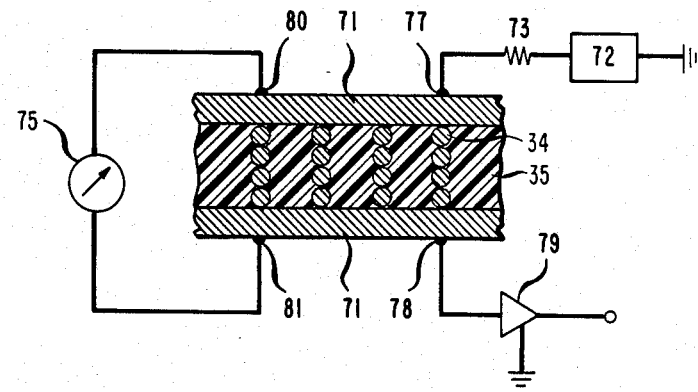
FIG. 7 schematically shows a preferred sensor assembly in accordance with the invention including electrical contact detection circuitry.

FIG. 7 schematically shows the pressure sensing portion of a graphics input system. Conductive particles 34 are aligned into chains in nonconductive matrix material 35, and contact assemblies 71 are provided, e.g., as in FIGS. 3-6. An essentially-constant-current source 72 is connected in series with resistor 73 at contact point 77, and an operational amplifier 79 is connected at contact point 78. (A complete device typically comprises four corner contact points and corresponding operational amplifiers; with reference to FIG. 2 such four points correspond to terminals 22, 23, 24, and 25). A voltmeter 75 is connected between contact points 80 and 81 as can be used to measure resistance as a function of pressure applied in the course of device operation. (At least at low levels of pressure, resistance may be relatively unaffected by the amount of pressure applied to the sensor; however, at higher pressures the resistance typically decreases with increasing pressure. The resulting current variations can be utilized, e.g., to control the intensity of a cathode-ray beam used in a display device, thus permitting gradation of output intensity).

Pressure-responsive sensors in accordance with the invention function analogous to sensors disclosed in the above-identified patent application by J. Federico et al. which is incorporated herein by reference. In particular, locally applied pressure causes localized current flow between sheet electrodes, and the position of such current flow can be determined from currents, voltages, or resistances observed at specific points at the periphery of the sensor such as, e.g., the four terminals 22, 23, 24, and 25 shown in FIG. 2.

A pressure-responsive snesor in accordance with the invention is more specifically described as follows: Electrically conductive, magnetic particles are aligned into essentially straight chains as resulting from application of a magnetic field in the z-direction of desired conductivity transverse to the x-y plane of the matrix material.

Particles are made from a magnetic material such as, e.g., iron, nickel, cobalt, an alloy comprising iron, nickel, cobalt, or a ferrite material, possibly coated with a protective material such as, e.g., silver, gold, or an alloy comprising silver or gold. Particles may be spherical, rod-shaped, oval-shaped, or irregularly shaped, and typical particle diameters are in a range from 0.1 to 500 micrometers and preferably in a range from 1 to 200 micrometers.

A composite medium typically contains conductive particles as a fraction in an amount of 0.5-20 percent by volume. For transparency a fraction of less than approximately 2 percent is preferred; however, in the interest of high resolution of position sensing, higher percentages may be preferred.

Magnetic field strengths suitable for particle alignment depend on layer thickness, greater field strength being advantageous for thinner layers. Typical field strengths are in a range from 100 to 2000 oersteds and, more typically, in a range from 300 to 800 oersteds.

Nonconductive matrix materials may have elastomeric, adhesive, or glassy properties; among suitable materials are polymeric materials such as, e.g., silicone rubber, epoxies, polyurethanes and other resins. Curing of silicone and thermosetting resins may be accomplished by heating in a furnace or by inductive or microwave means; alternatively, light-sensitive resins may be cured upon exposure to optical radiation which may be visible, infrared, or ultraviolet.

The material of the conductor assembly substrate is typically a polymer or plastic material such as, e.g., mylar, polyethylene, cellulose acetate, Teflon, or any other transparent polymer in the form of a thin sheet; a transparent conductive layer may be made as a thin layer of a material such as, e.g., indium tin oxide or gold (typically having a thickness of approximately 500 Angstroms).

Nonconductive coating layers are puncturable under pressure and typically have a thickness in a range from 0.1 to 50 micrometers and preferably in a range of 0.5 to 10 micrometers. Substrate and coating materials preferably are chosen so as not to chemically react with each other.

Among advantages of a pressure-responsive sensor device in accordance with the invention are the following:

The pressure sensor is characterized by a threshold pressure below which there is no appreciable electrical conduction between top and bottom sheet conductors. This aspect is advantageous in that, e.g., a hand resting on a position sensor pad does not produce a signal, while a suitable stylus readily produces a signal as it is being pressed against the sensor pad. Threshold pressure depends on material and processing parameters such as, e.g., thickness of the nonconductive layer and field strength used in the alignment of magnetic conductive particles.

Threshold pressure translates into threshold force directly as a function of the radius of curvature of the tip of a stylus. Also, threshold force can be increased by choosing a compliant material as pressure sensor support. At forces above the threshold force, conductivity tends to increase directly as a function of force, and this aspect can be used, e.g., in signature recognition systems as an additional identification parameter.

The pressure sensor can be made from transparent materials so that, e.g., a display screen can be viewed through a write pad or finger-touch-sensitive pad. Such pad may be permanently attached to a display screen or it may be removable and designed for placement as needed. Similarly, transparency of the pressure sensor is an advantage for tracing an underlying pattern such as, e.g., a map or chart. Transparency of pressure sensors in accordance with the invention typically is such that 70 to 95 percent of visible light is transmitted. Transparency as well as position sensitivity are dependent on volume percentage of conductive particles, and light transmission of approximately 80 percent is feasible in combination with desirable sensitivity.

EXAMPLE

A silicone resin material known as RTV 615 as manufactured by General Electric Inc. was mixed with 1 volume percent nickel spheres having a diameter of approximately 20 micrometers. The nickel spheres were coated with a layer of gold approximately 1000 Angstroms thick. The mixture was spread on a flat glass substrate to form a layer having a thickness of approximately 5 mils, and the layer was cured in a magnetic field having a strength of 400 oersteds. Curing was in an oven at a temperature of approximately 100 degrees C. for a duration of approximately 10 minutes.

The cured layer was tested for transparency and was found to transmit approximately 82 percent of incident light. Spacing between particle columns was approximately 6 mils as is indicative of position sensing resolution. The cured layer was then spray-coated with a layer of nonconductive coating of RTV silicone having a thickness of approximately 5 micrometers and then placed between two mylar sheets coated with thin layers of indium-tin oxide. The electrical resistance between the two conductive sheets was greater than 20 mega-ohms in the absence of pressure as well as under pressure as produced by a writing hand resting on the assembly, such latter pressure being estimated as approximately 2 psi.

When the tip of a pencil was pressed on the assembly at a normal writing pressure of approximately 100 psi, resistance dropped to 4827 ohms for the combined electrical path consisting of the conductive sheets and the conductive particle chains. Since a conductive particle chain contributes not more than approximately 1 ohm to such resistance, a determination of position can be made simply on the basis of measured resistance.

What is claimed is:

1. A device which comprises two conductor assemblies in a facing relationship,
    said assemblies being spaced one from the other by matter comprising a body of a composite medium,
    said medium comprising magnetically aligned electrically conductive magnetic particles in a relatively nonconductive matrix material,
    said aligned particles forming a plurality of paths spaced one from the other by a region of relatively nonconductive matter,
    each path including at least two particles and having direction from one assembly to the other, and
    said paths comprising conductive particles and at least one region of relatively nonconductive matter.

2. The device of claim 1, said device comprising means for applying a voltage between said conductor assemblies.

3. The device of claim 2, said device comprising means for determining the position of localized pressure between said conductor assemblies.

4. The device of claim 3, said device comprising means for displaying said position.

5. The device of claim 4, said device comprising transmission means between said means for determining said position and said means for displaying said position.

6. The device of claim 2, said device comprising means for determining the amount of pressure between said conductor assemblies.

7. The device of claim 1, said composite medium comprising electrically conductive magnetic particles in a volume percentage in the range of from 0.5 to 20.

8. The device of claim 7, said conductor assemblies and said composite medium being transparent, and said volume percentage being less than or equal to 2.

9. The device of claim 1, the thickness of said region of relatively nonconductive matter being greater than or equal to 0.5 micrometer.

10. The device of claim 1, a conductor assembly comprising a conductive layer on a substrate and a nonconductive layer on said conductive layer.

11. The device of claim 1, said composite medium being coated with at least one nonconductive layer.

12. The device of claim 1, a conductor assembly comprising a conductive layer on a substrate, and at least one end particle in a path being coated with a nonconductive layer.

13. The device of claim 1, at least one end particle in a path being recessed from the surface of said composite medium.

14. Composite sheet medium comprising magnetically aligned conductive magnetic particles in a relatively nonconductive matrix material,
    said aligned particles forming a plurality of paths spaced one from the other by a region of relatively nonconductive matter,
    each path including at least two particles and having direction from one surface of said sheet medium to the other, and
    said paths comprising conductive particles and at least one region of relatively nonconductive matter.

15. Composite sheet medium of claim 14, said medium being optically transparent such that at least 70 percent of visible light incident on said medium is transmitted by said medium.

* * * * *